(12) United States Patent
Stouffer

(10) Patent No.: US 6,338,268 B1
(45) Date of Patent: Jan. 15, 2002

(54) LEAK DETECTION METHOD AND APPARATUS

(75) Inventor: Ronald D. Stouffer, Silver Spring, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 0 days.

(21) Appl. No.: 09/634,592

(22) Filed: Aug. 8, 2000

Related U.S. Application Data

(60) Provisional application No. 60/147,503, filed on Aug. 9, 1999.

(51) Int. Cl.[7] .............................................. G01M 3/04
(52) U.S. Cl. ........................................................ 73/40
(58) Field of Search ............................... 73/40, 861.19, 73/861.21; 137/826

(56) References Cited

U.S. PATENT DOCUMENTS

| | | | | |
|---|---|---|---|---|
| 4,709,622 A | * | 12/1987 | Stouffer et al. ............. 454/125 |
| 5,396,808 A | * | 3/1995 | Huang et al. ............ 73/861.19 |
| 5,780,738 A | * | 7/1998 | Saunders .................. 73/504.06 |
| 5,864,067 A | * | 1/1999 | Ligneul et al. .......... 73/861.21 |
| 5,889,213 A | * | 3/1999 | Guizot et al. ............ 73/861.19 |
| 5,983,943 A | * | 11/1999 | Parry et al. .................. 137/826 |

FOREIGN PATENT DOCUMENTS

| | | | | |
|---|---|---|---|---|
| AU | 703888 | * | 1/1996 | ......... F15C/001/22 |
| GB | 2120384 | * | 11/1983 | ............. G01P/5/01 |

* cited by examiner

Primary Examiner—Hezron Williams
Assistant Examiner—Jay L. Politzer
(74) Attorney, Agent, or Firm—Jim Zegeer

(57) ABSTRACT

A leak detection system and method for fluid operated device includes a backloaded fluidic oscillator having an interaction chamber, a power nozzle at its upstream end coupled to a source of fluid under pressure and an exit throat at its downstream end. The interaction chamber first diverges from the power nozzle and then converges towards the exit throat. A pair of outlet passages are connected to the exit throat; one of the outlet passages is connected to the fluid operated device and the other of the outlet passages is connected to a fixed volume and a vent whereby the backloaded fluidic oscillator oscillates at a rate which is a function of the leakage of the fluid operated device.

5 Claims, 2 Drawing Sheets

LEAK DETECTION METHOD AND APPARATUS

REFERENCE TO RELATED APPLICATION

The present application is the subject of provisional application No. 60/147,503 filed Aug. 9, 1999 and entitled LEAK DETECTION METHOD AND APPARATUS.

BACKGROUND AND BRIEF DESCRIPTION OF THE INVENTION

It has been found that a rudimentary, hanging-water-tube, vacuum-test results correlates well enough with a frequency method of determining the relative leak rate of a check valve to verify the existence of a relationship between the two. The frequency results, compared to a commercial leak rate tester which measures the mass flow at 2 psi vacuum as shown in FIG. 1. This is a very good correlation in the world of leak detection.

It turns out that check valve devices having noncompliant mating surfaces and stringent leakage requirements are measured by applying a hard vacuum (14.7 psi) and measuring the small leakage ($10^{-3}$ to $10^{-9}$ cc/sec of air) via a helium gas tracer. Devices having compliant mating surfaces and less stringent requirements are measured by applying a smaller pressure or partial vacuum and directly measuring the mass flow of the leakage in the greater than $10^{-3}$ cc/sec range.

Mating surfaces of rubber, plastic, etc., fall into the compliant category so that the leak performance would be vastly improved if tested with a hard vacuum, but the results are unobtainable in practice. As may have been expected, these "soft-surfaced" devices usually experience relatively small pressure differentials in practice so that hard vacuum techniques are not appropriate. Mass flow meters are used to directly measure the leakage from these soft-surface devices at the low-pressure differentials experienced in practice.

A general current trend is that soft-surfaced devices are chosen because they are forgiving in spite of loose tolerances, but the acceptance criteria are by demand creeping toward more stringency. For example, the acceptable check valve samples above are in the $10^{-3}$ to $10^{-4}$ range. This is just beyond the mass flowmeter's capability. It is believed that the present invention's frequency technique will detect leaks into the $10^{-5}$ cc/sec range.

Currently, the frequency method has been shown to operate around the $10^{-3}$ range and has the advantage of being very fast in reading (under one second). The testing hardware and software are economical compared to that of the current methods, and there is minimal stress placed on the compliant seat materials.

Valve

Many spring-loaded valves/closures are inherently unstable and therefore oscillate when operated with air in a direction to force them open. FIG. 2 shows a ball check valve in three stages of opening.

The left sketch of FIG. 2 shows the ball just at the point of opening where the pressure force Fp is just equal to the spring force Fk. The inertial force of the ball Fi is zero at this instance.

The middle sketch of FIG. 2 shows the gap h opened to less than 0.001 inches. Because the flow is in the capillary regime, the pressure force Fp acts counter to the spring and inertial forces so that the motion of the ball is upward.

In the right sketch of FIG. 2, the gap h has opened in excess of 0.001 inches and channel flow commences. Here the pressure rapidly diminishes (sometimes goes negative) and the pressure force Fp becomes less than the sum of the spring and inertial forces so that the ball decelerates its upward motion and reverses to move toward the seat. As the ball nears the seat (within h<0.001 inches), the pressure rises quickly (being proportional to $h^3$) and the ball bounces on the air film to again reverse and take an upward turn, completing one cycle of oscillation.

As can be seen, the dynamics of the oscillation will be dependent, at the extremely small-gap part of the cycle, on the detailed geometry of the ball and seat at their interface. When the mating parts of the sealing surface contain an imperfection such as a small scratch, the frequency of oscillation will be slower than that of a more perfect set.

Non-Oscillating Devices and the Present Invention

In some cases using very compliant materials such as rubber, the sealing device can be non-oscillating or oscillate so weakly that frequency detection is impractical. In the present invention, a fluid element is configured so that it oscillates owing to being back-loaded.

An object of the invention is to provide an improved leak detection method and apparatus.

Another object of the invention is to provide an improved fluidic detection method and apparatus.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
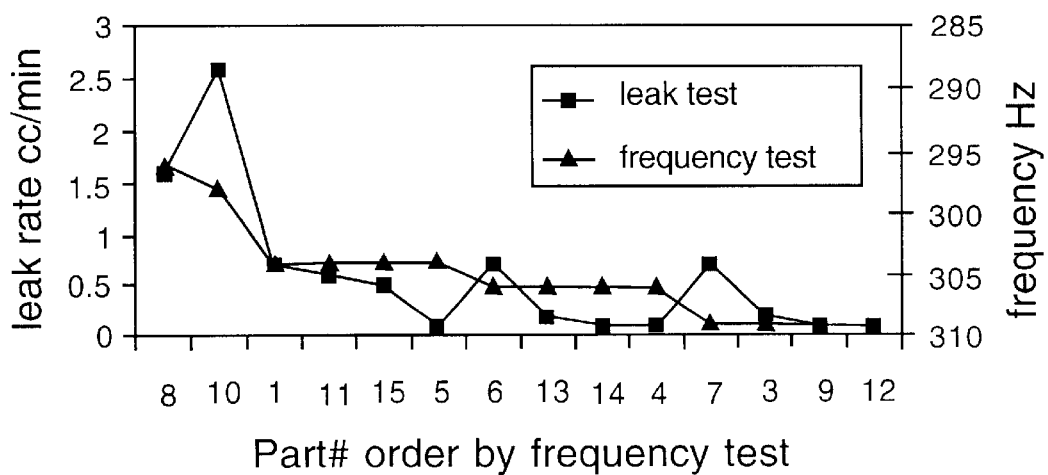
FIG. 1 is a plot of the frequency results, compared to a commercial leak rate tester which measures the mass flow at 2 psi vacuum performed by the Vacuum Instrument Corp.
Figure 2:
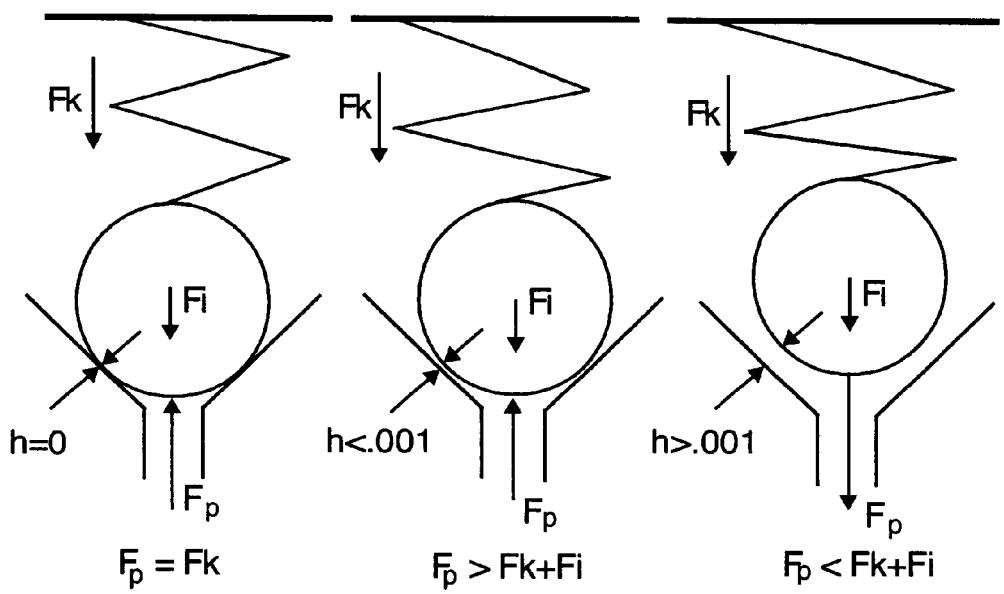
FIG. 2 shows a ball check valve in three stages of opening.
Figure 3:
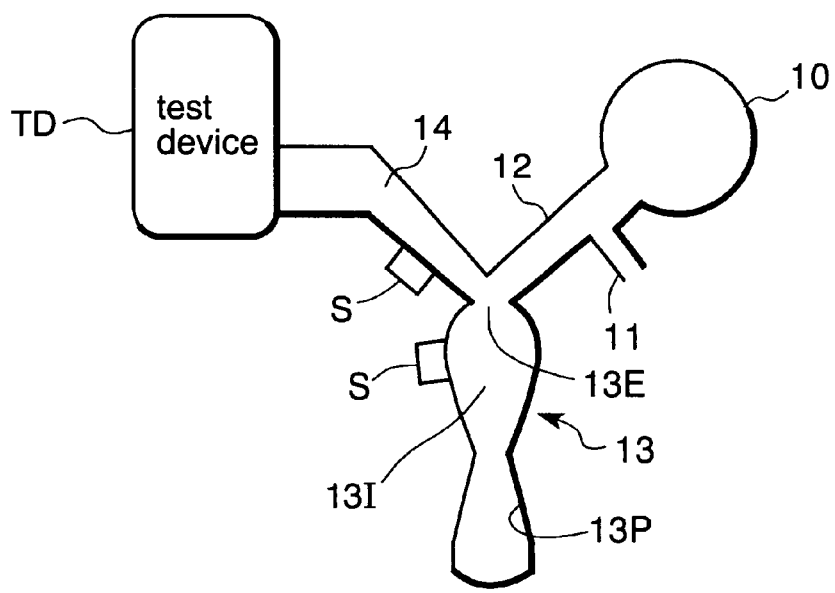
FIG. 3 is a schematic diagram of a leak testing system incorporating the invention.

Referring now to FIG. 3, a fixed volume 10 and vent 11 on the right output leg 12 of the bi-stable fluidic element 13 determines the time period the power jet resides in the right-hand receiver 14. When this receiver pressure reaches a certain value, the element switches, by back-loading, to the left receiver where the test device TD is attached. The device (a valve as shown in FIG. 2) unseals momentarily, but then reseals (because of the spring), and the fluidic element is switched to the right receiver, again by backloading. The time spent in the right receiver is constant, but the time spent in the left receiver differs from each sample and is dependent upon the detailed geometry and material constructional make-up of each sample. The backloaded fluidic oscillator 13 has an interaction chamber 13S, a power nozzle 13B at its upstream end coupled to a source of fluid under pressure, and an exit throat 13E at its downstream end. The interaction chamber 13S first diverges from the power nozzle 13B and then converges towards the exit throat 13E. The pair of outlet passages 12 and 14 are connected to the exit throat. Outlet passage 14 is connected to the fluid operated device 70 and the other outlet passage 12 is connected to a fixed volume 10 and a vent 11 whereby the backloaded fluidic oscillator oscillates at a rate which is a function of the leakage of said fluid operated device. The sensor S could be alternately located on the fluidic oscillator interaction chamber 13±.

The frequency being measured by sensor S is the reciprocal of the total period. A more accurate result could be obtained by measuring only the time period spent in the left (sample testing) receiver.

The frequency is related to the leak rate of the tested device as it was with the inherently oscillatory sealing devices.

While the invention has been described in relation to preferred embodiments of the invention, it will be appreciated that other embodiments, adaptations and modifications of the invention will be apparent to those skilled in the art.

What is claimed is:

1. A leak detection system for fluid operated device comprising:

a backloaded fluidic oscillator having an interaction chamber, a power nozzle at its upstream end coupled to a source of fluid under pressure, and an exit throat at its downstream end, said interaction chamber first diverging from said power nozzle and then converging towards said exit throat, a pair of outlet passages connected to said exit throat, one of said outlet passages being connected to said fluid operated device and the other of said outlet passages being connected to a fixed volume and a vent whereby said backloaded fluidic oscillator oscillates at a rate which is a function of the leakage of said fluid operated device.

2. The system defined in claim 1 wherein said fluid operated device is a check valve.

3. A leak detection method for fluid operated device comprising:

providing a backloaded fluidic oscillator having an interaction chamber, a power nozzle at its upstream end coupled to a source of fluid under pressure, and an exit throat at its downstream end, said interaction chamber first diverging from said power nozzle and then converging towards said exit throat, a pair of outlet passages connected to said exit throat, one of said outlet passages being connected to said fluid operated device and the other of said outlet passages being connected to a fixed volume and a vent whereby said backloaded fluidic oscillator oscillates at a rate which is a function of the leakage of said fluid operated device.

4. The system defined in claim 3 wherein said fluid operated device is a check valve.

5. A leak detection system for fluid operated device comprising a bistable fluidic switch element having first and second output legs and a power nozzle supplying working fluid to said bistable fluidic switch element, a fixed volume and vent connected to one of said output legs and a device to be tested connected to the other of said output legs, said bistable fluidic switch being backload-responsive and oscillating at a rate which is the function of the leakage of said fluid operated device, and sensors located on said fluidic oscillator for sensing the frequency of oscillation.

* * * * *